May 16, 1950  J. H. DE RUSSY  2,507,562
HYDRAULIC DRIVE AND FUEL FEED FOR MOTOR VEHICLES
Filed Sept. 16, 1947  3 Sheets-Sheet 1

JOHN H. DE RUSSY, Inventor

By McMorrow, Berman & Davidson
Attorneys

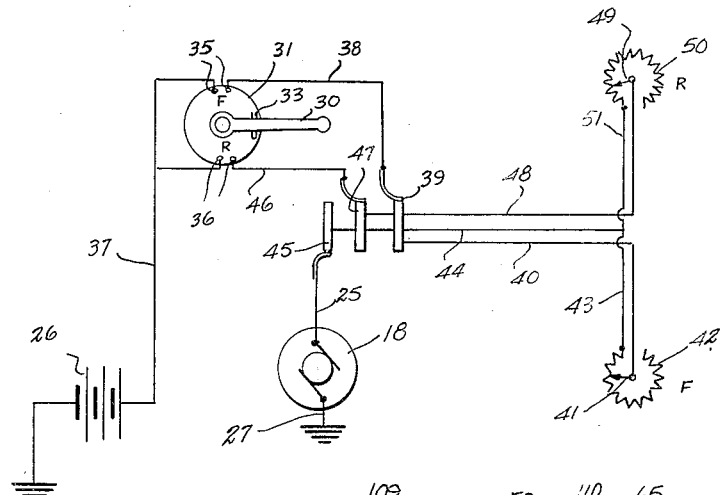
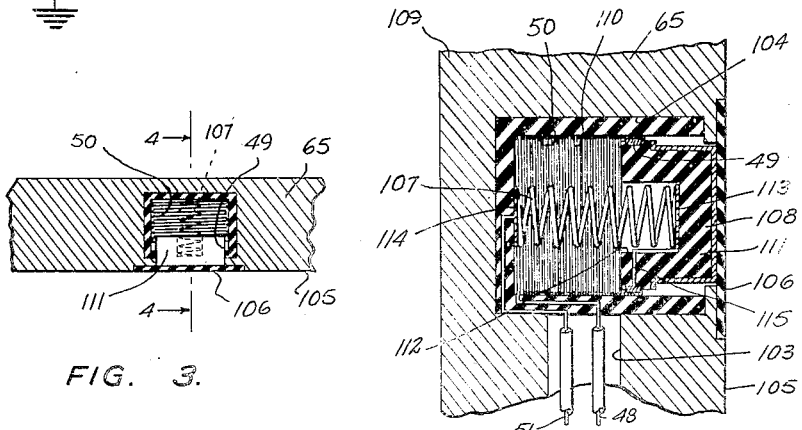
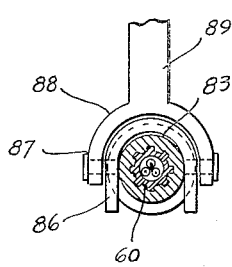

May 16, 1950  J. H. DE RUSSY  2,507,562
HYDRAULIC DRIVE AND FUEL FEED FOR MOTOR VEHICLES
Filed Sept. 16, 1947  3 Sheets-Sheet 3
FIG. 6.
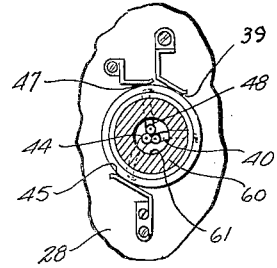
FIG. 7.
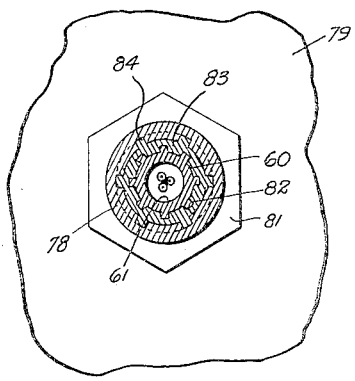
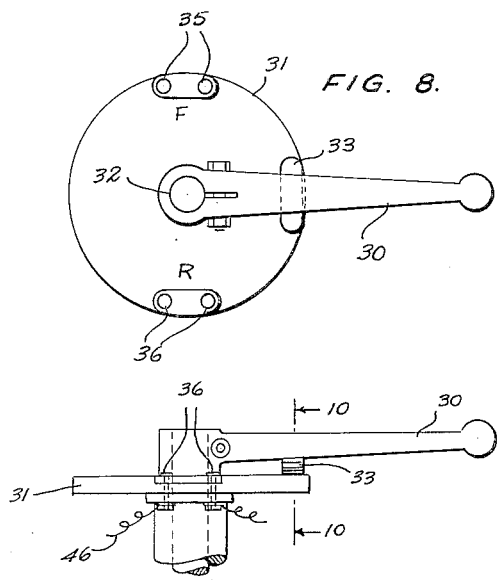
FIG. 8.
FIG. 9.
FIG. 10.
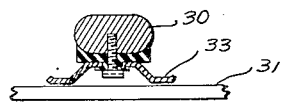
John H. De Russy, Inventor
By McMorrow, Berman & Davidson
Attorneys Patented May 16, 1950

2,507,562

UNITED STATES PATENT OFFICE 2,507,562

HYDRAULIC DRIVE AND FUEL FEED FOR MOTOR VEHICLES

John H. de Russy, San Antonio, Tex.

Application September 16, 1947, Serial No. 774,400

12 Claims. (Cl. 192—.084)

My invention relates to a combined hydraulic drive and automatic fuel feed for a motor vehicle whereby fuel is automatically fed to the engine of the vehicle in accordance with its needs.

With the foregoing in view, an object of my invention is to provide an improved hydraulic drive for a motor vehicle.

A further object of my invention is to provide an improved fuel feed for a motor vehicle, wherein actuation of the accelerator is effected to actuate electrical means to automatically feed fuel to the engine in accordance wtih the needs thereof.

A further object is to provide an improved hydraulic drive for motor vehicles wherein is included means for varying the pitch of at least one of the driven or driving blades of the hydraulic unit.

A further object is to provide an improved combination of a hydraulic drive including variable pitch blades with an automatic fuel feed whereby the fuel feed is increased automatically as the pitch of the blades is increased.

A further object is to provide in a novel combination of hydraulic drive and fuel feed such as that last described means whereby as the pitch of the blades is increased an increase of fuel feed is accomplished by electrical means.

A further object is to provide in a combined hydraulic drive and fuel feed wherein the hydraulic drive includes blades having a variable pitch means whereby variations in the pitch of the blades is controlled by an accelerator actuating mechanism and wherein the increase of hydraulic pressure on the blades incident to the increase of the pitch thereof is effective to actuate electrical means for automatically feeding fuel to the engine in accordance with the power required thereby.

Other objects and advantages reside in the particular structure of the device, combination and arrangement of the several parts thereof, and/or in the particular method or mode of operation, all of which will be readily apparent to those skilled in the art upon reference to the accompanying drawings, in connection with the following specification wherein the invention is shown, described and claimed.

In the drawings:

Figure 2 is a diagrammatic view showing the electric circuits and the associated parts diagrammatically;

Figure 3 is a transverse horizontal section taken substantially on the plane of lines 3—3 of Figure 1 but on an enlarged scale;

Figure 4 is a transverse vertical section taken substantially on the plane of the line 4—4 of Figure 3 and on a further enlarged scale;

Figure 5 is a transverse vertical section taken substantially on the plane of the line 5—5 of Figure 1;

Figure 6 is a transverse vertical section taken substantially on the plane of the line 6—6 of Figure 1;

Figure 7 is a transverse vertical section taken substantially on the plane of the line 7—7 of Figure 1;

Figure 8 is a plan view of a detail of Figure 1 but shown on a slightly enlarged scale;

Figure 9 is an elevational view of the detail of Figure 8; and

Figure 10 is a transverse vertical section on an enlarged scale taken substantially on the plane of the line 10—10 of Figure 9.

Figure 1:
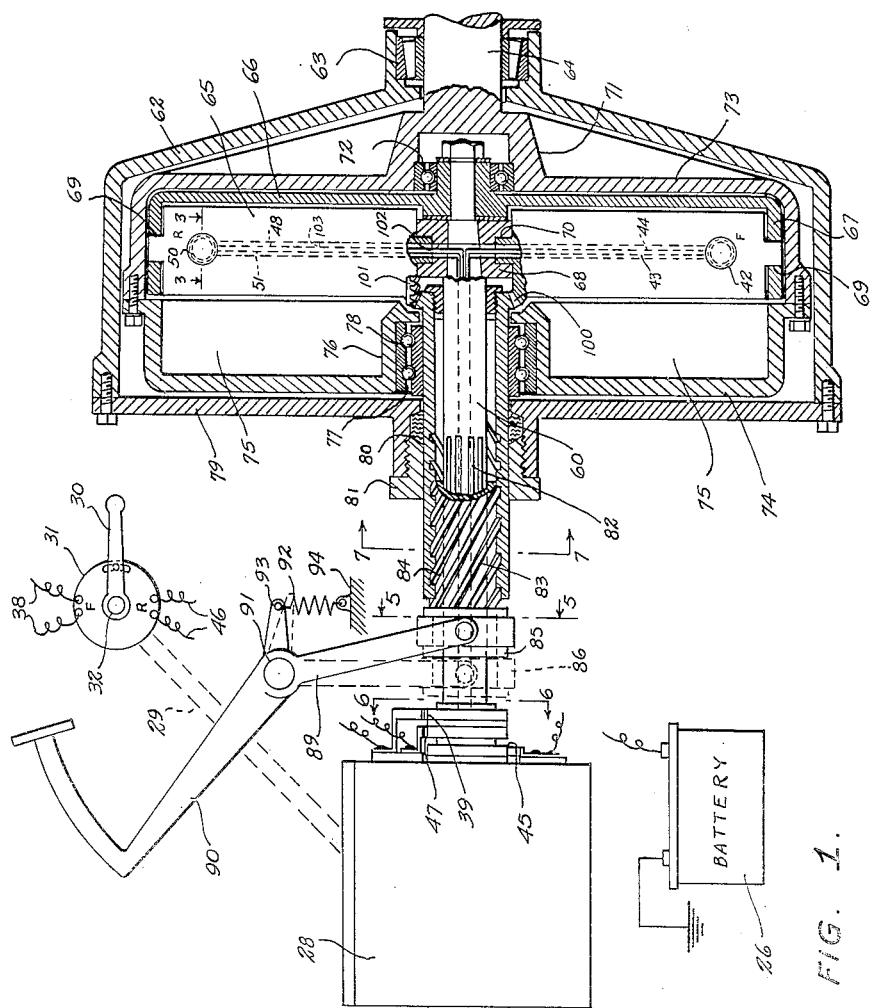
Figure 1 is an elevation partly diagrammatic in character and with parts broken away and shown in longitudinal vertical section of a preferred embodiment of the invention.

Referring specifically to the drawings, wherein like reference characters have been used throughout the several views to designate like parts, 11 designates generally an internal combustion engine having a carbureter 12 and an actuating lever 13 for the usual butterfly accelerator valve. A manually operated rod 14 is connected to the free end of the butterfly valve lever 13 and terminates in any suitable actuating means such as a knob, not shown, on the dashboard of an automotive vehicle, not shown. A second operating rod 15 for the butterfly valve lever 13 is pivotally connected thereto and extends rearwardly and slidably through an opening 16 in any suitable housing 17 positioned adjacent the engine. A variable speed electric servomotor 18 is suitably mounted in the housing 17 and is connected by suitable leads 25 to the battery 26 for the engine 11. The shaft 19 of the motor 18 is provided with a suitable collar or ears 20 to which are pivotally connected for swinging movement radially of the shaft a pair of governor arms 21, such governor arms carrying weights 22 at their free ends which free ends are pivotally connected by any suitable means such as the yoke 24 to a sleeve 23 which is rotatable with the shaft 19 and slidable relative thereto axially thereof. The free end of the sleeve 23 is pivotally connected to the free end of the auxiliary accelerator valve operating arm 15 whereby to reciprocate the same as the sleeve 23 is reciprocated relative to the shaft 19.

It follows from the foregoing that as the motor 18 operates at various speeds the weights 22 will be thrown radially outwardly by centrifugal force and as they do so will operate to reciprocate the sleeve 23 towards the motor whereby to move the auxiliary operating arm 15 to the right and open the butterfly valve varying degrees commensurate with the speed of rotation of the motor 18. Thus, by varying the speed of the motor 18 in accordance with the load required (as will appear later) the proper amount of fuel is automatically fed to the carbureter 12 as required for the particular load involved.

The crank shaft, not shown, of the engine 11 leads into a suitable transmission 28 which preferably contains but a single speed forward and a single speed in reverse. Any suitable operating means such as illustrated diagrammatically by 29 connect the transmission 28 to an operating lever 30 pivoted, as at 32, on a suitable support 31. In the position shown in Figures 1 and 8 the operating lever 30 is in a neutral position but when it is swung to the position F it is understood that the transmission is shifted to the forward speed position and when it is swung to the position R it is understood that the transmission 28 is shifted to reverse.

Referring particularly to Figures 1, 2, 8, 9 and 10, it is apparent that the operating lever 30 also comprises a double throw switch having the contact 33 on the under surface thereof which is slidable on the upper surface of the support 31. Spaced contacts 35 are provided at forward speed position and are adapted to be bridged by the contact 33 when the lever 30 is thrown to such forward speed position. In like manner when the lever 30 is thrown to a reverse position the contact 33 bridges a pair of spaced contacts 36. Referring specifically to Figure 2, it will be seen that the main lead 37 from the battery 26 provides a branch lead 38 which is normally open by the spaced contacts 35 and which is connected by a slip ring connection 39 to a further lead 40 which in turn is connected to the movable element 41 of any suitable rheostat 42. The rheostat 42 in turn, is connected by a lead 43 to a lead 44 and slip ring connection 45 to the main lead 25 of the motor 18, which is grounded by any suitable means 27. In like manner the spaced contacts 36 maintain a branch lead 46 normally open but when closed connect the same to a slip ring connection 47, to a lead 48, to the movable element 49 of any suitable rheostat 50. The rheostat 50 in turn, is connected by a lead 51 to the lead 44 described aforesaid. Thus, with the operating lever 30 in the neutral position shown in Figure 2 it is obvious that both branch leads 38 and 46 from the battery 26 are open so no electric current can flow to the motor 18. However, it is equally obvious that swinging the lever 30 to either the forward or reverse position will close the circuit to the motor 18 through one of the rheostats 42 and 50 and that the speed of the motor 18 will vary in accordance with the position of the movable members 41 or 49 of the two rheostats.

A driving shaft 60 extends rearwardly from the transmission 28 and is provided with an axial bore 61 through which extend the leads 44, 48 and 40 previously described. The driving shaft 60 extends into a sealed hydraulic housing 62 of any suitable form which surrounds and rotatably mounts by any suitable bearing 63 the drive shaft 64 of the device. Inwardly of the housing 62 the free end of the driving shaft 60 has mounted thereon for rotation therewith a plurality of impeller blades 65 and a wheel portion 66. The wheel portion 66 terminates in a forwardly directed annular flange 67 which overlies the free ends of the blades 65. The free ends of the blades 65 are pivoted, as at 69, in the flange 67 and the inner or root ends of the blades are pivoted, as at 70, in a hub 68 which is fixed on the free end of the driving shaft 60. It is obvious from the foregoing, that the arrangement just described permits the blades 65 to be pivoted on their own axis whereby the pitch of said blades may be varied.

The drive shaft 64 inwardly of the housing 62 and rearwardly of the free end of the driving shaft 60 is provided with a hub 71 which is rotatably mounted on the free end of the driving shaft by any suitable bearings 72. The forward end of the hub 71 terminates in an outwardly directed web 73 which surrounds the free ends of the driving blades 65 and terminates in an inwardly directed web 74 and a second hub 76 which is rotatable by any suitable bearings 77 on a sleeve 78 to be described later. On the inner face of the second web 74 there are provided a number of fixed driven impeller blades 75 which are in opposed operative relation to the driving blades 65. The forward face of the housing 62 is closed by a suitable cover 79 detachably connected to the housing in any suitable manner and the axial portions of such cover are formed to provide a packing gland 80 surrounding the sleeve 78 and sealed thereto by a suitable packing nut 81.

The driving shaft 60 is surrounded by a sleeve 83 which is slidably connected thereto for rotation therewith by external splines 82 on the outer surface of the driving shaft 60 and corresponding complementary splines on the inner surface of the sleeve 83. The outer surface of the sleeve 83 is provided with a plurality of worm splines 84 which are seated in complementary splines formed on the inner surface of the sleeve 78. The forward end of the sleeve 83 is formed to provide a double flanged collar 85 which receives therebetween the yoke 86 which is pivotally connected, as at 87, to the free ends of a second yoke 88 of the actuating arm 89 of a pedal 90 which is pivotally connected, as at 91, to the frame of the vehicle.

The rear end of the sleeve 78 terminates within the housing 62 and is formed to provide on the free end thereof a beveled gear 100 which is in constant mesh with segmental beveled gears 101 formed on the adjacent inner edges of the driving blades 65.

In the portion of the invention just described it is obvious that as the driving shaft 60 is rotated the sleeve 83 and the outer sleeve 78 rotate therewith along with the driving blades 65 and that there is no relative movement of the parts. However, upon depression of the pedal 90 the arm 89 thereof will be moved from the broken line position in Figure 1 to the solid line position whereby the inner sleeve 83 is reciprocated rearwardly along the driving shaft 60. At the same time, the worm splines 84 on the outer surface of the sleeve 83 operate to rotate the outer sleeve 78 relative to the driving shaft 60 whereby relative movement occurs between the beveled gear 100 and the segmental beveled gears 101 carried by the blades. Thus, upon such relative rotation the pitch of the blades is varied from the closed position shown in Figure 1 to a full feathered position, not shown, at right angles thereto. Upon release of the pedal 70 any suitable spring means 92 connecting a bell crank 93 of the pedal 90 to any suitable frame portion 94 serves to return the pedal 90 together with the sleeve 83 to the broken line position, Figure 1, whereby the driving impeller blades 65 are returned to the full feathered or neutral position.

Although I have shown and described but a pair of driving blades 65 and driven blades 75 it is to be understood that as many such blades as are necessary may be incorporated.

At least two of the driving blades 65 are formed to mount pressure responsive means for controlling the speed of the variable speed motor 18. Such means are best illustrated in Figures 1, 2, 3 and 4 and in the embodiment shown comprise rheostats 50 and 42, fixed in opposite faces of oppositely disposed driving blades 65 whereby to statically and dynamically balance the driving impeller. In the embodiment shown the rheostat 50 is operative when the operating handle 30 has been shifted to the reverse position and the rheostat 42 is operated when the handle 30 has been shifted to the forward position. As is clearly shown in Figure 1 the driving shaft 60 is provided with an internal axially disposed bore 61 which terminates in the region of the hub 68 in a pair of oppositely and radially directed passages 102 which open into passages 103 which extend axially of the driving blades 65. These passages 102 and 103 carry the lead wires 40, 48, 51 and 53 by which the rheostats are connected to the motor 18.

Referring specifically to Figures 3 and 4 it is noted that two of the driving blades 65 are provided on the working faces thereof with a recess 104 into which opens the passage 103. The recess 104 may be lined with suitable insulating material 109 as shown. The recess 104 opens onto the forward face 105 of the blades 65 but is sealed to prevent the admission of hydraulic fluid thereto by a cover member 106 sealed across the open mouth of such recess. The cover member 106 is formed of any suitable fluid tight flexible material whereby it will yield when subjected to pressure generated by rotation of the driving impeller. In the embodiment shown, a coil type of rheostat 50 is provided, Figure 4, having a fixed coil 110 to which is connected the lead 48. A piston member 108 is the slider for said rheostat and comprises a generally cylindrical body of insulating material having an axial bore 112 which seats one end of a coil spring 107. The floor of the axial bore 112 is lined with a layer of current conducting material 113. An annular band 49 of current conducting material surrounds the periphery of the piston 111 and is adapted to contact the inner surface of the coil 110. The inner end of the coil spring 107 bears against a plate 114 fixed in the floor of the recess 104 atop the floor layer of insulating material 109 and is connected to the free end of the lead 51. A suitable lead 115 connects the annular contact member 49 with the plate 113 in the floor of the recess in the piston 111. The outer face of the piston 111 is connected to the flexible cover 106 in any suitable manner whereby pressure on the working face 105 of the driving blade 65 is operative to slide the piston 111 axially of the fixed coil 110 whereby to vary current transmitted to the variable speed motor 18.

Thus, in the embodiment shown as pressure on the working face 105 increases the movable contact member 49 of the piston 111 is moved relative to the fixed coil 110 of the rheostat whereby to increase the flow of current to the motor 18 which in turn increases the speed thereof and is therefore operative to spread the governor weights 22 and reciprocate the butterfly valve operating rod 15 to open the butterfly valve wider and increase the flow of fuel to the carbureter 12. The rheostat 50 which has just been described is operative only when the operating lever 30 is thrown into the reverse position as it is then only that the working face 105 of the driving blade 65 is subjected to pressure within the housing 62. The rheostat 42 which is on the opposite face of the opposite blade 65 is operative only when the operating lever 30 is thrown to the forward speed position. Such rheostat 42 is essentially identical to the rheostat 50 and no further description thereof is thought to be necessary.

While I have shown a particular form of rheostat in conjunction with the driving blades 65, it is to be understood that any suitable rheostat may be used in place thereof and in this connection, certain pressure actuated types of rheostats such as disc-like carbon pile rheostat is particularly applicable to use on blades of this type by reason of the relative thinness of such rheostats.

The operation of the device is as follows. Inasmuch as the embodiment shown has been depicted as being applied to an automobile or the like the description of the operation thereof will be limited to an automobile. However, it is to be understood that the invention is susceptible to application with any sort of device embodying a power plant, a driving and driven shaft and a hydraulic coupling between such shafts. The engine 11 is started in the usual manner and gasoline feed is controlled by the operating rod 14 for the butterfly valve. Thereafter, the operator shifts the lever 30 to either the forward or reverse position while any usual clutch 120, Figure 1 is engaged. At this time, the engine is idling and when the clutch 120 is disengaged the driving shaft 60 and driving blade 65 will be rotated at idling speed. The intermediate sleeve 83 is in the broken line position, Figure 1, and the driving blades 65 are in a full feathered position at right angles to the position shown in Figure 1. In this situation there is insufficient pressure on either face of the blades 65 to overcome the action of the spring 107 of the rheostats whereby only sufficient current is supplied to the variable speed motor 18 to maintain the same at a speed sufficient for an idling speed to the carbureter 12. Obviously, in this situation the driving blades 65 are ineffective to rotate the driven blades 75 and the drive shaft 64. Consequently, the vehicle remains motionless even though the clutch 120 is disengaged and the device is in gear.

To start the vehicle moving, the accelerator pedal is depressed whereby to throw the arm 89 thereof to the solid line position, Figure 1, which in turn actuates the intermediate sleeve 83 to rotate the outer sleeve 78 relative to the driving shaft and, through the beveled gear 100 and segmental gears 101 the driving blades 65 are rotated to the driving position shown. When this occurs, pressure on the rheostat 42, assuming the operating lever 30 has been thrown to the forward position, is greatly increased, whereby the movable element is automatically moved axially of the stationary element of the rheostat whereby to supply maximum current to the variable speed motor 18. This in turn is operative to retract the butterfly valve actuating rod 15 to the fullest extent whereby to supply maximum fuel to the carbureter 12. Such increase in speed is effective to increase the speed of rotation of the driving shaft 60 and driving blades 65 whereby to operatively couple such driving blades to the driven blades 75 and rotate the drive shaft 64. Maximum pressure on the forward speed rheostat 42 is maintained until the inertia of the drive shaft 64 is overcome whereupon as such pressure is lessened the spring 107 is operative to project the movable element 111 of the rheostat whereby to cut down the supply of current to the motor 18 and thereby reduce its speed and reduce the flow of fuel to the carburetor 12 to a point commensurate with the load on the drive shaft 64, without, however, necessarily reducing the speed of rotation of the latter.

Of course, it is not necessary to depress the accelerator pedal all the way and when the same is depressed to a position intermediate the solid and broken line positions, Figure 1, the pitch of the driving blades 65 will be intermediate the full feathered position and the position shown in Figure 1. Irrespective of the pitch of the driving blades 65, pressure on the rheostat 42 will be greatest at the point of starting when it is necessary to overcome the inertia of the drive shaft 64 and the load carried thereby. Thus, even though the driving blades are set only at an intermediate pitch it is quite like that the pressure will be sufficiently great to provide maximum power to the engine 11 if the same is necessary. It should be clear from the foregoing, therefore, that the driver of the vehicle does not feed the fuel to the engine 11 manually and directly once the accelerator pedal 99 has been depressed. Thereafter, fuel feed is automatic in accordance with the load required and by proper adjustment of the parts it is possible to get a much more economical flow of fuel than is possible with a direct manual control as it is well known that operators of automobiles frequently tend under heavy load conditions to feed more gas than the engine can take and thereby cause an inefficient operation of the engine.

While I have shown a preferred embodiment of the invention it is understood that the same is susceptible of other forms of expressions and that I am not limited to the precise structure shown and described except as hereinafter claimed.

What is claimed is:

1. In a hydraulic coupling for an internal combustion engine, the combination with a sealed housing, at least one driving and at least one driven impeller blade rotatably mounted in said housing in opposed operative relation, means coupling said engine to said driving blade to rotate the latter, a fuel feed for said engine, and actuating means for said fuel feed; of pressure responsive means operatively associated with at least one of said blades, and means operatively connecting said pressure responsive means and said actuating means whereby to actuate the latter to vary the fuel feed as pressure on said pressure responsive means is varied.

2. In a hydraulic coupling for a variable speed driving means, the combination with a sealed housing, at least one driving and at least one driven impeller blade rotatably mounted in said housing in opposed operative relation, and means operatively coupling said driving means to said driving blade to rotate the latter; of means for controlling the speed of said driving means, comprising pressure responsive means operatively associated with one of said blades, and means operatively connecting said pressure responsive means to said means for controlling the speed of said driving means whereby to actuate the latter to vary the speed of said driving means as pressure on said pressure responsive means is varied.

3. In a hydraulic coupling for a variable speed driving means, the combination with a sealed housing, at least one driving and at least one driven impeller blade rotatably mounted in said housing in opposed operative relation, and means operatively coupling said driving means to said driving blade to rotate the latter; of speed control means for controlling the speed of said driving means, comprising a variable speed electric motor, a source of electric current for said motor, a circuit connecting said source to said motor, means connecting said speed control means to said motor for actuation thereby, whereby to vary the speed of said driving means as said motor speed varies, a pressure responsive rheostat in said circuit and operatively associated with one of said blades, said rheostat being operative to vary the speed of said motor as pressure on said rheostat is varied.

4. In a hydraulic coupling for an internal combustion engine, the combination with a sealed housing, at least one driving and at least one driven impeller blade rotatably mounted in said housing in opposed operative relation, means coupling said engine to said driving blade to rotate the latter, a fuel feed for said engine, and actuating means for said fuel feed; of pressure responsive means operatively associated with at least one of said blades, a variable speed electric motor, means operatively connecting said motor to said actuating means to vary the fuel feed as the speed of said motor is varied, a source of electric current for said motor, a circuit connecting said source to said motor, said pressure responsive means being in said circuit and operatively positioned on a working face of one of said blades, and said pressure-responsive means being operative to vary the flow of current to said motor as pressure on said working face of said blade is varied.

5. In a hydraulic coupling for the drive shaft of an internal combustion engine, including a sealed hydraulic housing, at least one driving impeller blade rotatable in said housing and operatively connected to said engine for rotation thereby, and at least one driven impeller blade rotatable in said housing in opposed operative relation to said driving blade and fixed on said drive shaft, means outwardly of said housing for varying the pitch of said driving blade, pressure responsive means on the working face of said driving blade, a fuel feed control for said engine, and means operatively connecting said pressure responsive means to said feed control to actuate the latter to vary the fuel feed automatically as pressure on said working face is varied.

6. A hydraulic coupling for a driving and a driven shaft, comprising a sealed housing, at least one driving and at least one driven impeller blade in said housing in opposed operative relation and fixed to their respective shafts for rotation therewith, speed-control means for varying the speed of said driving shaft, pressure responsive means on the working face of one of said blades, and means operatively connected to said pressure-responsive means for utilizing variations in pressure on said working face to actuate said speed-control means to vary the speed of said driving shaft.

7. In a hydraulic coupling for an internal combustion engine, the combination with a sealed housing, at least one driving and at least one driven impeller blade rotatably mounted in said housing in opposed operative relation, means coupling said engine to said driving blade to rotate the latter, a fuel feed for said engine, and actuating means for said fuel feed, of a variable-speed electric motor, means operatively connecting said motor to said actuating means to vary the fuel feed as the speed of said motor is varied, a source of electric current for said motor, a circuit connecting said source to said motor, a pressure-responsive rheostat in said circuit, means mounting said rheostat on a working face of one of said blades, and said rheostat being operative to vary the flow of current to said motor as pressure on said working face of said blade is varied.

8. In a hydraulic coupling for a variable-speed driving means, the combination with a sealed housing, at least one driving and at least one driven impeller blade rotatably mounted in said housing in opposed operative relation, and means operatively coupling said driving means to said driving blade to rotate the latter, of speed-control means for controlling the speed of said driving means, a variable-speed electric motor, a source of electric current for said motor, a circuit connecting said source to said motor, means connecting said speed-control means to said motor for actuation thereby, whereby to vary the speed of said driving means as said motor speed varies, a pressure-responsive rheostat in said circuit, one of said blades having a working face formed with a recess, said rheostat being disposed in said recess, a pressure-transmitting yieldable cover sealing said recess for transmitting pressure on said working face to said rheostat, and said rheostat being operative to vary the flow of current to said motor whereby to vary the speed of said driving means as the pressure on said working face is varied.

9. In a hydraulic coupling for a variable-speed driving means, the combination with a sealed housing, at least one driving and at least one driven impeller blade rotatably mounted in said housing in opposed operative relation, and means operatively coupling said driving means to said driving blade to rotate the latter, of speed-control means for controlling the speed of said driving means, a variable-speed electric motor, a source of electric current for said motor, a circuit connecting said source to said motor, means connecting said speed-control means to said motor for actuation thereby, whereby to vary the speed of said driving means as said motor speed varies, a pressure-responsive rheostat in said circuit, one of said blades having a working face formed with a cylindrical recess, a fixed coil of said rheostat lining said recess, a slider for said rheostat axially of said coil, a pressure-transmitting yieldable cover sealing said recess, said slider being mounted on said cover for movement therewith whereby to vary the resistance of said rheostat responsive to variations in pressure on said working face, and said rheostat being thereby operative to vary the flow of current to said motor whereby to vary the speed of said motor as pressure on said working face is varied.

10. In a hydraulic coupling for a variable-speed driving means, the combination with a sealed housing, at least one driving and at least one driven impeller blade rotatably mounted in said housing in opposed operative relation, and means operatively coupling said driving means to said driving blade to rotate the latter, of means for controlling the speed of said driving means, one of said blades having a working face formed with a recess therein, pressure-responsive means in said recess, a pressure-transmitting yieldable cover sealing said recess and operatively connected to said pressure-responsive means to actuate the latter, and means operatively connecting said pressure-responsive means to said means for controlling the speed of said driving means whereby to actuate the latter to vary the speed of said driving means as pressure on said pressure-responsive means is varied.

11. A hydraulic coupling for a driving and a driven shaft, comprising a sealed housing, at least one driving and at least one driven impeller blade in said housing in opposed operative relation and fixed to their respective shafts for rotation therewith, one of said blades having a working face formed with a recess therein, pressure-responsive means in said recess, a pressure-transmitting yieldable cover sealing said recess and operatively connected to said pressure-responsive means to actuate the latter, and a remotely-disposed speed-control means for said driving shaft operatively connected to said pressure-responsive means for actuation thereby in accordance wtih variations in pressure on said working face.

12. A hydraulic coupling for a driving and a driven shaft, comprising a sealed housing, at least one driving and at least one driven impeller blade in said housing in opposed operative relation and fixed to their respective shafts for rotation therewith, one of said blades including a working face formed with a recess therein, a pressure-responsive rheostat in said recess, a remotely-disposed speed-control means for said driving shaft, an electric servo for actuating said speed-control means, and circuit-providing means operatively connecting said rheostat to said servo to actuate the latter to operate said speed-control whereby to vary the speed of said driving shaft in accordance with variations in pressure on said working face.

JOHN H. DE RUSSY.

REFERENCES CITED

The following references are of record in the file of this patent:

UNITED STATES PATENTS

| Number | Name | Date |
| --- | --- | --- |
| 1,259,090 | Ferris | Mar. 12, 1918 |
| 1,807,706 | Rinne | June 2, 1931 |
| 1,843,960 | Sticelber | Feb. 9, 1932 |
| 1,900,120 | Lysholm et al. | Mar. 7, 1933 |
| 2,192,714 | Norman | Mar. 5, 1940 |
| 2,204,492 | Heintz | June 11, 1940 |
| 2,226,801 | Block | Dec. 31, 1940 |
| 2,326,821 | Boyle | Aug. 17, 1943 |
| 2,382,034 | Wemp | Aug. 14, 1945 |